United States Patent
Berger

(10) Patent No.: US 9,185,403 B2
(45) Date of Patent: Nov. 10, 2015

(54) METHOD, APPARATUS AND SYSTEM FOR VISUAL INSPECTION OF TRANSCODED VIDEO

(75) Inventor: Gad Moshe Berger, Kendall Park, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 2005 days.

(21) Appl. No.: 11/795,637

(22) PCT Filed: May 31, 2005

(86) PCT No.: PCT/US2005/018822
§ 371 (c)(1),
(2), (4) Date: Jul. 19, 2007

(87) PCT Pub. No.: WO2006/080943
PCT Pub. Date: Aug. 3, 2006

(65) Prior Publication Data
US 2008/0144727 A1    Jun. 19, 2008

Related U.S. Application Data

(60) Provisional application No. 60/645,716, filed on Jan. 24, 2005.

(51) Int. Cl.
H04N 17/00 (2006.01)
H04N 19/154 (2014.01)
H04N 19/40 (2014.01)

(52) U.S. Cl.
CPC ........... *H04N 17/004* (2013.01); *H04N 19/154* (2014.11); *H04N 19/40* (2014.11)

(58) Field of Classification Search
CPC .... H04N 17/004; H04N 19/154; H04N 19/40

USPC .............. 375/240.12, 240.13, 240.25, 240.29
See application file for complete search history.

(56) References Cited

U.S. PATENT DOCUMENTS 5,243,447 A * 9/1993 Bodenkamp et al. ......... 345/629
5,262,856 A * 11/1993 Lippman et al. ......... 375/240.12
(Continued)

FOREIGN PATENT DOCUMENTS

EP        1069764        1/2001

OTHER PUBLICATIONS

Wiegand, Thomas, et al. "Rate-constrained coder control and comparison of video coding standards." Circuits and Systems for Video Technology, IEEE Transactions on 13.7 (2003): 688-703.*
(Continued)

*Primary Examiner* — Kari Schmidt
(74) *Attorney, Agent, or Firm* — Robert D. Shedd; Jorge Tony Villabon

(57) ABSTRACT

The present invention provides a method, apparatus and system for visually comparing a video file against its source as the video file is being re-encoded, for example, into another video format. In accordance with an embodiment of the present invention, a video frame and a corresponding re-encoded video frame are placed into a single wide (combined) video frame to display each image, for example, side-by-side in the same frame. By synchronizing the source video frames with the re-encoded video frames and displaying them on the same wide video frame, differences caused by, for example, the encoding process may be visually determined as the video is being re-encoded into a desired, second video format.

16 Claims, 3 Drawing Sheets

(56) References Cited

U.S. PATENT DOCUMENTS

| | | | |
|---|---|---|---|
| 5,319,793 A * | 6/1994 | Hancock et al. | 345/602 |
| 5,365,277 A * | 11/1994 | Greggain | 348/571 |
| 5,374,963 A * | 12/1994 | Willis | 348/564 |
| 5,537,157 A * | 7/1996 | Washino et al. | 348/722 |
| 5,625,410 A | 4/1997 | Washino et al. | |
| 5,633,683 A * | 5/1997 | Rosengren et al. | 375/240.01 |
| 5,821,997 A * | 10/1998 | Kawamura et al. | 348/231.6 |
| 5,835,129 A | 11/1998 | Kumar | |
| 6,421,385 B1 * | 7/2002 | Uenoyama et al. | 375/240.2 |
| 6,597,961 B1 * | 7/2003 | Cooke | 700/94 |
| 6,614,441 B1 * | 9/2003 | Jiang et al. | 345/539 |
| 7,050,622 B2 * | 5/2006 | Morishima et al. | 382/148 |
| 7,133,051 B2 * | 11/2006 | Sloo et al. | 345/629 |
| 7,194,032 B1 * | 3/2007 | Easwar et al. | 375/240.12 |
| 7,346,271 B2 * | 3/2008 | Komi et al. | 386/232 |
| 2002/0006165 A1 * | 1/2002 | Kato | 375/240.25 |
| 2002/0024999 A1 * | 2/2002 | Yamaguchi et al. | 375/240.03 |
| 2005/0190872 A1 * | 9/2005 | Seong et al. | 375/354 |
| 2006/0171463 A1 * | 8/2006 | Hanamura et al. | 375/240.13 |
| 2007/0263731 A1 * | 11/2007 | Yamada et al. | 375/240.26 |

OTHER PUBLICATIONS

Zitnick, C. Lawrence, et al. "High-quality video view interpolation using a layered representation." ACM Transactions on Graphics (TOG). vol. 23. No. 3. ACM, (2004): 600-608.*

Kim, J. et al: "MPEG-based Image Enhancement for the Visually Impaired", Optical Engineering, vol. 43, No. 6, pp. 1318-1328, Jun. 2004, XP002358810.

International Search Report, dated Dec. 23, 2005.

* cited by examiner

METHOD, APPARATUS AND SYSTEM FOR VISUAL INSPECTION OF TRANSCODED VIDEO

This application claims the benefit, under 35 U.S.C. §365 of International Application PCT/US2005/018822, filed May 31, 2005 published in accordance with PCT Article 21(2) on Aug. 3, 2006 in English and which claims the benefit of U.S. provisional patent application No. 60/645,716, filed Jan. 24, 2005.

TECHNICAL FIELD

This invention relates to video encoding systems, and more particularly, to a method, apparatus and system for the visual inspection of a video file as it is being re-encoded, for example, into another video format.

BACKGROUND ART

When re-encoding video from one format to another, it is difficult to determine how the various encoding parameters will affect the resultant video images. Some prior art solutions for comparing an original video to its resultant newly encoded counterpart include encoding a video stream and subsequently playing both the original video and the newly encoded video, separately, to detect any differences. However, an encoding process may be lengthy, and waiting to compare the video streams after an encoding process is complete does not allow for real time adjustments in the encoding process and is not the most efficient solution. In addition, in such prior art solutions, there is no sure way of synchronizing the video streams to each other for comparison.

BRIEF SUMMARY OF THE INVENTION

The present invention addresses the deficiencies of the prior art by providing a method, apparatus and system for the visual inspection of transcoded video in real time.

In one embodiment of the present invention, a method for the visual inspection of a video stream as it is being re-encoded into a second video format includes splitting a decoded video stream into at least a first and a second portion, re-encoding the first portion of the split video stream into the second video format, and arranging a frame of the decoded video of the second portion of the split video stream and a corresponding frame of the re-encoded video into a combined video frame such that the decoded video frame and the corresponding re-encoded video frame appear together in the combined video frame.

In an alternate embodiment of the present invention, a video mixer for enabling the visual inspection of a video file as it is being re-encoded into a second video format includes a processor and a memory pool, and the video mixer is adapted to perform the steps of receiving, frame by frame, a decoded, split second portion of the video stream, receiving, frame by frame, a corresponding re-encoded, split first portion of the video stream, and arranging a frame of the decoded video of the second portion of the split video stream and a corresponding frame of the re-encoded video into a combined video frame such that the decoded video frame and the corresponding re-encoded video frame appear together in the combined video frame.

In an alternate embodiment of the present invention, a system for enabling the visual inspection of a video file as it is being re-encoded into a second video format includes a video decoder for decoding a received video stream, a stream splitter for splitting the decoded video stream into at least a first and a second portion, an encoder for receiving the first portion of the split, decoded video stream and re-encoding the received portion of the decoded video stream into the second video format, and a video mixer comprising a processor and a memory. The video mixer of the present invention is adapted to perform the steps of, receiving the second portion of the split, decoded video stream, receiving the re-encoded first portion of the video stream from the encoder, and arranging a frame of the decoded video of the second portion of the split video stream and a corresponding frame of the re-encoded video into a combined video frame such that the decoded video frame and the corresponding re-encoded video frame appear together in the combined video frame. The system of the present invention may further include a display device for displaying the frame of the decoded video and the corresponding frame of the re-encoded video in the combined video frame.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention advantageously provides a method, apparatus and system for the visual inspection of transcoded video in real time. Although the present invention will be described primarily within the context of the visual comparison of the frames of a decoded original video stream and a re-encoded video stream, it will be appreciated by those skilled in the relevant art, informed by the teachings of the present invention that the concepts of the present invention may be applied for the visual comparison of more than two video streams.

Figure 1:
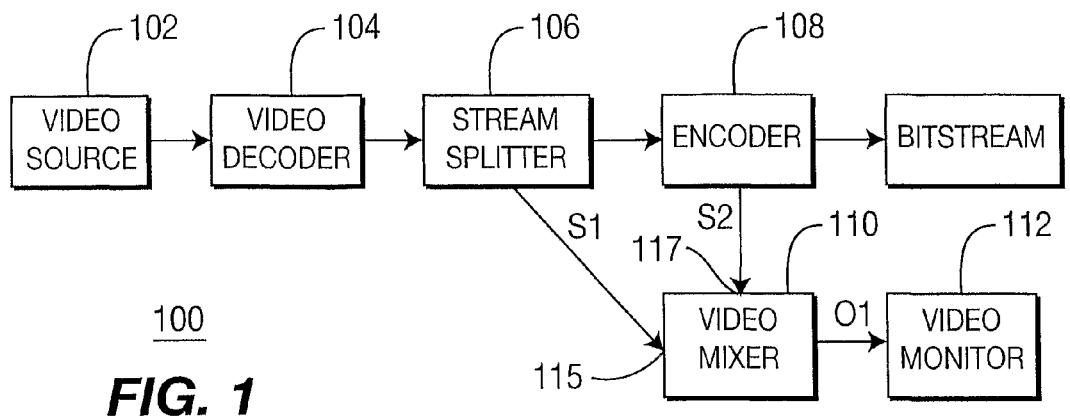
FIG. 1 depicts a high level block diagram of a video encoding and visual comparison (VEVC) system in accordance with an embodiment of the present invention.

FIG. 1 depicts a high level block diagram of a video encoding and visual comparison (VEVC) system in accordance with an embodiment of the present invention. The VEVC system 100 of FIG. 1 illustratively comprises a video source 102, a video decoder 104, a video stream splitter 106, an encoder 108, a video mixer 110 and a display device (illustratively a video monitor) 112. In the VEVC 100 of FIG. 1, a video stream from the video source 102 is communicated to the video decoder 104. In the video decoder 104, the video stream is decoded into, for example RGB or YUV, and the decoded video stream is communicated to the stream splitter 106. The stream splitter 106 splits the decoded video stream into two substantially identical streams. A first stream is communicated to the encoder 108 for encoding the received decoded video stream to a desired, second video format. A second stream from the stream splitter 106 is communicated to the video mixer 110.

The encoder 108 outputs the newly encoded bitstream while also providing a set of the re-encoded preview frames to the video mixer 110. The encoder 108 does not adjust the frame rate of the received video stream and as such, each video frame of the decoded original video stream communicated to the video mixer 110 will have a synchronized video frame communicated to the video mixer from the encoder 108. As illustrated in the VEVC 100 of FIG. 1, the video mixer 110 comprises two inputs 115 and 117. In the VEVC 100 of FIG. 1, the video stream communicated to the first input 115 is the decoded original video stream communicated from the stream splitter 106 and the video stream communicated to the second input 117 is the re-encoded video stream communicated from the encoder 108. The output of the video mixer 110 comprises a single (combined) video frame that is substantially the same height as the originals, but twice the width. This allows for the video image of the decoded original video stream and the video image of the re-encoded video stream to be located in the combined video frame to be displayed by the video monitor 112 for the visual inspection of the images for the detection of any differences.

Figure 2:
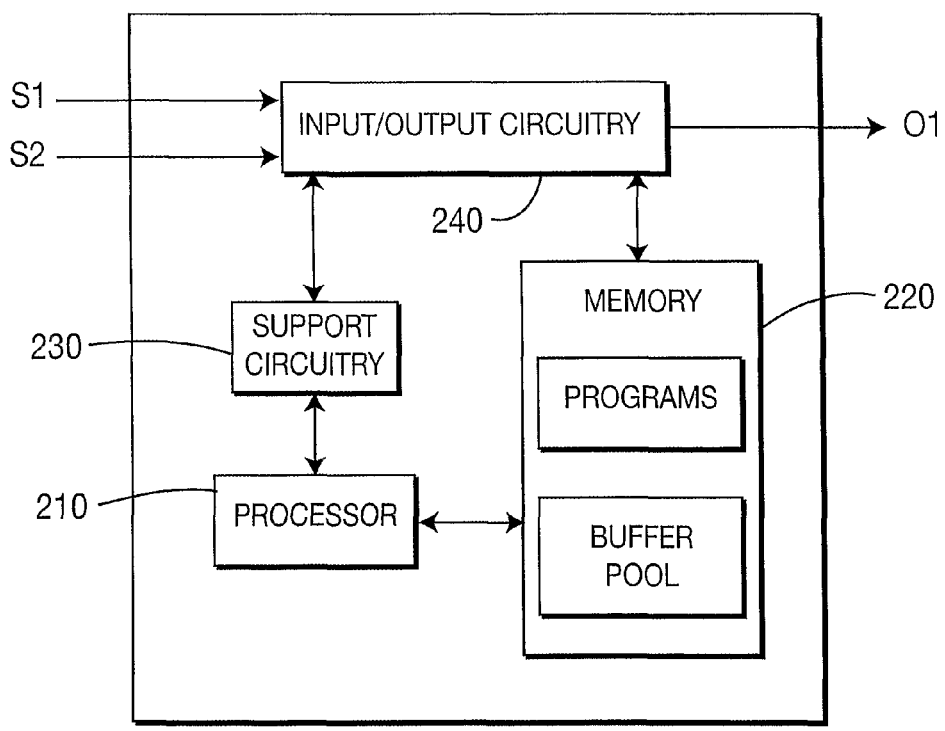
FIG. 2 depicts a high level block diagram of an embodiment of a video mixer suitable for use in the VEVC system 100 of FIG. 1.

FIG. 2 depicts a high level block diagram of an embodiment of a video mixer 110 suitable for use in the VEVC system 100 of FIG. 1. The video mixer 110 of FIG. 2 comprises a processor 210 as well as a memory 220 for storing control programs, buffer pools and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The video mixer 110 also contains input-output circuitry 240 that forms an interface between the various functional elements communicating with the video mixer 110. For example and as depicted in FIG. 1, the video mixer 110 communicates with the stream splitter 106 and the encoder 108 via a first path S1 and a second path S2, respectively, and communicates with the display device 112 via an output path O1.

Although the video mixer 110 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

A connection to the video mixer 110 by both the stream splitter 106 and the encoder 108 is negotiated with certain details of the video samples. That is, the video mixer 110 is informed that the first input 115 has an image (Width×Height) with (framerate) and the second input 117 has an image (Width×Height) with (Framerate). In one embodiment of the present invention, the inputs to the video mixer 110 (e.g., the decoded original video stream and the re-encoded video stream) are of the same height and width and the re-encoded video stream retains the frame rate of the decoded original video stream for proper synchronization. Such a configuration facilitates a best case comparison of the decoded original video stream and the re-encoded video stream. More specifically, if the inputs to the video mixer 110 are of the same height and width and the re-encoded video stream retains the frame rate of the decoded original video stream the output images will comprise substantially the same dimensions and will display corresponding video frames which makes comparing the two output video images much easier.

In a case where the inputs to the video mixer 110 (e.g., the decoded original video stream and the re-encoded video stream) are not of the same height and width and the re-encoded video stream does not retain the frame rate of the decoded original video stream a video mixer of the present invention, such as the video mixer 100 of FIG. 1, may alternatively reject the inputs and not performs any processing or may perform a scaling routine on one or both of the inputs. That is, in the latter case, the video mixer may attempt to scale the properties of the inputs (e.g., height, width and rate) such that the output images will comprise substantially the same dimensions and corresponding video frames will be displayed. In such an embodiment however, an adjusted video stream may result in degraded images.

Figure 3:
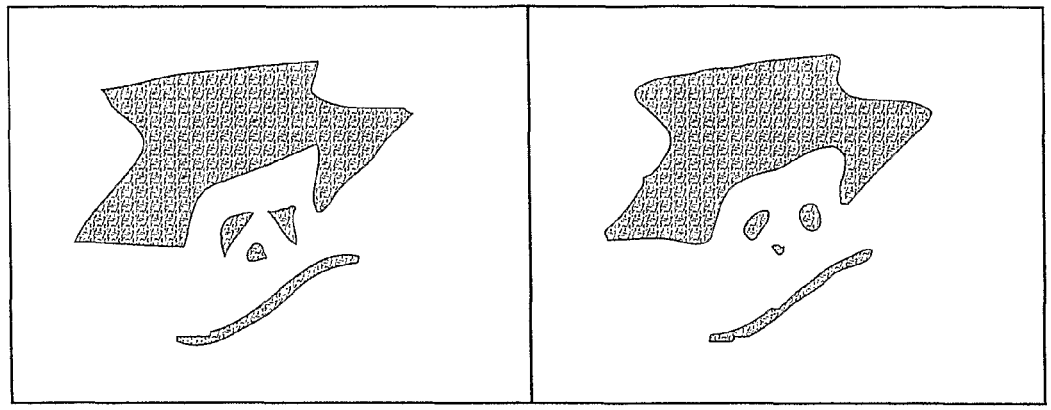
FIG. 3 graphically depicts the output of the video mixer for a mode of operation where corresponding video frames are displayed side by side in substantially the same orientation.

As previously stated, initially the input properties for the video streams are determined (e.g., color space, height, width, frame rate, etc.). Next, a buffer pool of wide (combined) frames (e.g., {input height}×{input width*2}×{quantization}) is created in the video mixer 110. For each frame received by the video mixer 110, a copy of the frame is stored in an appropriate location of the wide frame selected from the buffer pool. For example, for a first mode of operation, a decoded original video frame and a corresponding re-encoded video frame are copied into respective locations of the wide frame. In this first mode of operation, the video mixer 110 causes a decoded original video frame and a corresponding re-encoded video frame to be displayed on the video monitor 112 side-by-side in substantially the same orientation in a wide output frame. FIG. 3 graphically depicts the output of the video mixer 110 for this mode of operation. As depicted in FIG. 3, a decoded original video frame and a corresponding re-encoded video frame are displayed in the wide output frame in substantially the same orientation. Such a mode of operation of the present invention may be implemented for detecting relatively larger differences between the images due to, for example, the transcoding process.

Figure 4:
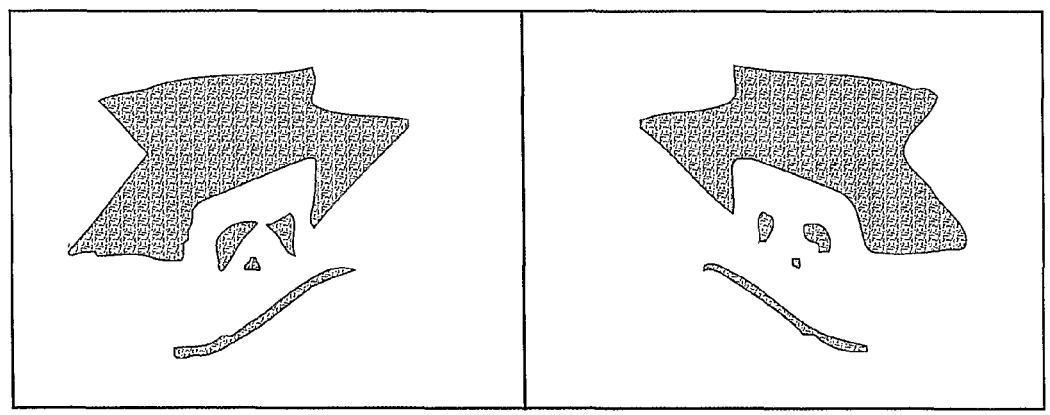
FIG. 4 graphically depicts the output of the video mixer for a mode of operation where a decoded original video frame is displayed normally and a corresponding re-encoded video frame is flipped along the x-axis.

For a second mode of operation, a decoded original video frame is copied into an appropriate location in the wide frame and a corresponding re-encoded video frame is copied into a location in the wide frame such that when displayed on the video monitor 112, the video frames appear inverted along the x-axis with respect to one another. That is, for this second mode of operation, the video mixer 110 causes a decoded original video frame and a corresponding re-encoded video frame to be displayed on the video monitor 112 side-by-side in a substantially reverse orientation from one another. More specifically, in this second mode of operation one of the video frames is displayed normally, whereas the second video frame is flipped along the x-axis in order to make pixel-by-pixel differentiation somewhat more evident. For example, in one embodiment of the present invention, a decoded original video frame is displayed normally and a corresponding re-encoded video frame is flipped along the x-axis. In an alternate embodiment of the present invention a re-encoded video frame is displayed normally and a corresponding decoded original frame is flipped along the x-axis. FIG. 4 graphically depicts the output of the video mixer 110 for this mode of operation for an embodiment where a decoded original video frame is displayed normally and a corresponding re-encoded video frame is flipped along the x-axis.

In an alternate embodiment of the present invention, a video mixer of the present invention a decoded original video frame and a corresponding re-encoded video frame are copied into locations in the wide frame such that the video frames are displayed on the video monitor 112 in a butterfly configuration such that half of the decoded original video frame is displayed next to a respective half of a corresponding re-encoded video frame. That is, on one side of the wide frame (e.g., the left half) a first half of the decoded original video frame is displayed next to a respective first half of a corresponding re-encoded video frame, and on the other side of the wide frame (e.g., the right half) a second half of the decoded original video frame is displayed next to a respective second half of a corresponding re-encoded video frame. However, such an embodiment requires additional processing in the video mixer to property locate the video frames in the wide frame.

Referring back to FIG. 1 and FIG. 2, in the video mixer 110, a queue is implemented for the wide frames of the buffer pool to define an order for the incoming video frames. In one embodiment, the queue comprises two Boolean identifiers, one for a filled left half of the wide frame and one for a filled right half of the wide frame, each half representing a complete video frame of either the decoded original video stream or the re-encoded video stream. The frames in the queues are numbered sequentially and the queues are treated as the respective frames themselves. When both sides, the left half and the right half, of the wide frame are filled the image in the wide frame is communicated to the video monitor 112. The wait is then incremented to the next buffer in the queue.

Figure 5:
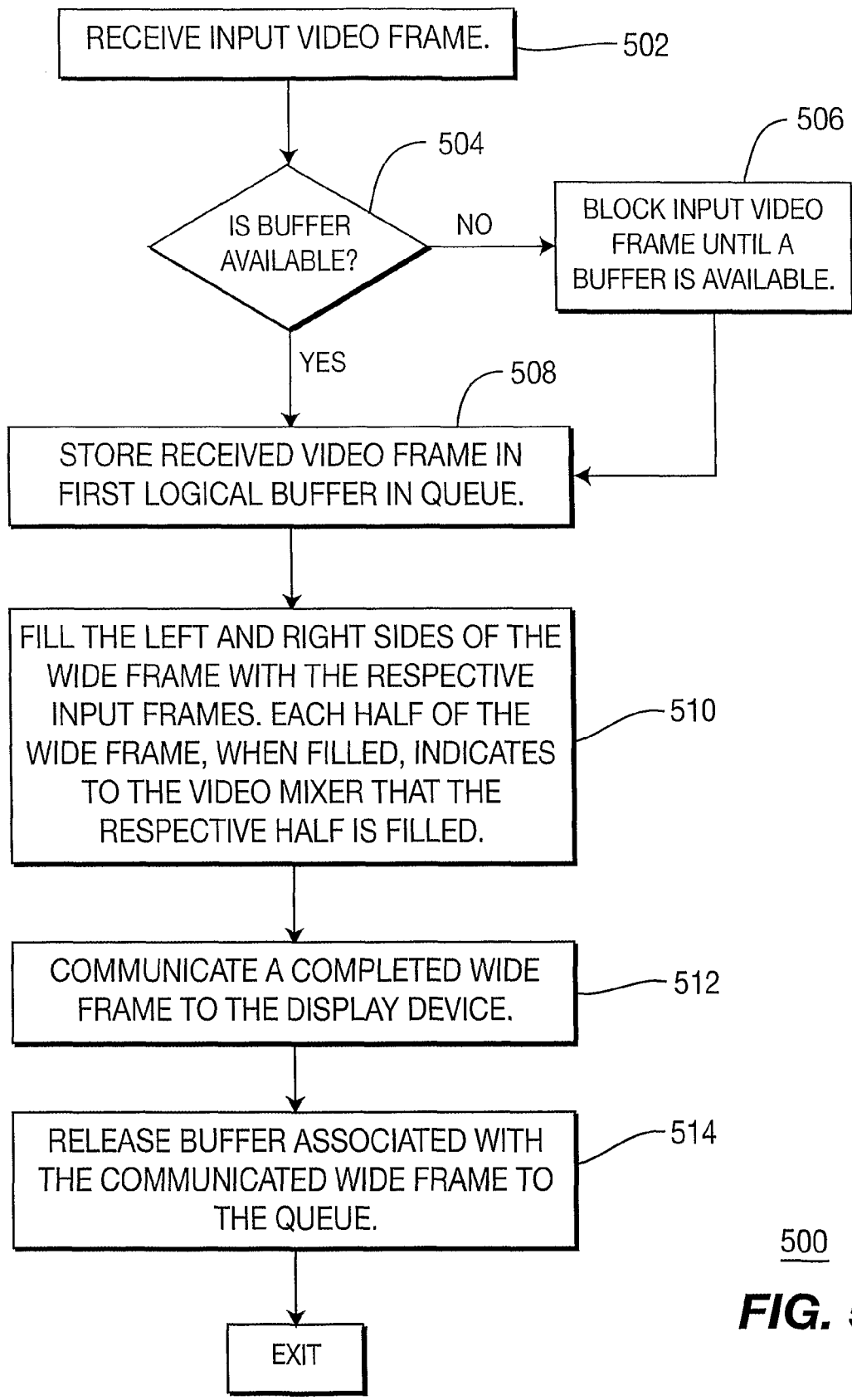
FIG. 5 depicts a flow diagram of a method in a video mixer for receiving video stream inputs and for communicating completed wide frames to a display device for visual comparison in accordance with an embodiment of the present invention.

FIG. 5 depicts a flow diagram of a method in a video mixer for receiving video stream inputs and for communicating completed wide frames to a display device for visual comparison in accordance with an embodiment of the present invention. The method 500 of FIG. 5 is entered at step 502 where a video mixer of the present invention receives an input video frame. The method 500 then proceeds to step 504. It should be noted that the steps of the method 500 of FIG. 5 are representative of both the decoded original video stream and the re-encoded video stream as they operate with the same buffer pool of wide frames.

At step 504, the video mixer determines if a buffer (wide frame) is available for the received video frame. If a buffer is not available, the method 500 proceeds to step 506. If a buffer is available, the method 500 skips to step 508.

At step 506, a received video frame is blocked until a buffer becomes available. The method 500 then proceeds to step 508.

At step 508, the received input video frame is stored in the first logical buffer in a queue. The method 500 then proceeds to step 510.

At step 510, the left and right sides of the wide frame are respectively filled with the received input frames. Each half of the wide frame, when filled, indicates to the video mixer that the respective half is filled. The method 500 then proceeds to step 512.

At step 512, a completed wide frame is communicated to the display device. The method 500 then proceeds to step 514.

At step 514, the buffer associated with the communicated wide frame is released to the queue. The method 500 is then exited.

In an alternate embodiment of the present invention, a video mixer in accordance with the present invention may include a separate thread to monitor the queues to determine if and when the wide frames, and as such the respective sides of the wide frames, are filled. In such an embodiment, when a wide frame is completely filled, the thread will cause the image to be sent to a display and will cause the release of the associated buffer to the queue.

While the forgoing is directed to various embodiments of the present invention, other and further embodiments of the invention may be devised without departing from the basic scope thereof. As such, the appropriate scope of the invention is to be determined according to the claims, which follow.

What is claimed:

1. A method for the visual inspection of a video stream as it is being re-encoded into a second video format, the method comprising:
   splitting a decoded video stream into at least two identical decoded video streams;
   re-encoding one of said at least two split video streams into the second video format;
   arranging a frame of the decoded video stream not having been re-encoded and a corresponding frame of the video stream re-encoded into the second video format into a combined wide video frame such that said decoded video frame and said corresponding re-encoded video frame appear together in the combined wide video frame, the frame having two associated boolean identifiers, one for a filled left half of the wide frame and one for a filled right half of the combined wide frame, with a left and right half of the combined wide video frame each representing a respective complete video frame of either the decoded portion of the video stream or the re-encoded portion of the video stream; and
   maintaining a buffer pool of wide frames for storing said combined decoded video frames and corresponding re-encoded video frames, wherein a queue is implemented for the wide frames of said buffer pool to define an order for stored video frames and the queue comprises the two boolean identifiers.

2. The method of claim 1, comprising performing a scaling routine on at least a portion said decoded video stream or on a corresponding portion of said re-encoded video stream to scale the respective portions of said video stream such that displayed images will comprise the same dimensions.

3. The method of claim 2, wherein at least one of a height, width or frame rate of at least one of said video stream portions are scaled.

4. The method of claim 1, wherein said decoded video frame and corresponding re-encoded video frame are arranged in the combined wide video frame to appear side-by-side.

5. The method of claim 1, wherein said decoded video frame and corresponding re-encoded video frame are arranged in the combined wide video frame such that the video frames appear inverted along the x-axis with respect to one another.

6. The method of claim 1, wherein said decoded video frame and corresponding re-encoded video frame are arranged in the combined wide video frame such that half of the decoded video frame appears next to a respective half of the corresponding re-encoded video frame.

7. An apparatus, comprising:
   a processor and a memory, for the visual inspection of a video stream as it is being re-encoded into a second video format, the processor and the memory configured to perform the steps of:
   receiving a decoded, split first video stream;
   receiving a corresponding re-encoded, split second video stream, said first video stream and said second video stream comprising two identical decoded split video streams derived from said video stream; and arranging a frame of the decoded video stream not having been re-encoded and a corresponding frame of the video stream re-encoded into the second video format into a combined wide video frame such that said decoded video frame and said corresponding re-encoded video frame appear together in the combined wide video frame, the frame having two associated boolean identifiers, one for a filled left half of the combined wide frame and one for a filled right half of the combined wide frame, with a left and right half of the combined wide video frame each representing a respective complete video frame of either the decoded portion of the video stream or the re-encoded portion of the video stream; and maintaining in said memory a buffer pool of wide frames for storing said combined decoded video frames and corresponding re-encoded video frames, wherein a queue is implemented for the wide frames of said buffer pool to define an order for stored video frames and the queue comprises the two boolean identifiers.

8. The apparatus of claim 7, wherein said apparatus is further adapted to perform a scaling routine on said received decoded first video stream or said received corresponding re-encoded second video stream to scale the received video streams such that displayed images will comprise the same dimensions.

9. The apparatus of claim 7, wherein said apparatus arranges received decoded video frames and received corresponding re-encoded video frames in respective combined wide video frames to appear side-by-side.

10. The apparatus of claim 7, wherein said apparatus arranges received decoded video frames and received corresponding re-encoded video frames in respective combined wide video frames such that the video frames appear inverted along the x-axis with respect to one another.

11. The apparatus of claim 7, wherein said apparatus arranges received decoded video frames and received corresponding re-encoded video frames in respective combined wide video frames such that half of a decoded video frame appears next to a respective half of a corresponding re-encoded video frame.

12. A system for the visual inspection of a video stream as it is being re-encoded into a second video format, the system comprising:

a video decoder for decoding a received video stream;

a stream splitter for splitting the decoded video stream into at least a first and a second portion;

an encoder for receiving the first portion of the split, decoded video stream and re-encoding the received portion of the decoded video stream into the second video format;

a video mixer comprising a processor and a memory, said video mixer adapted to perform the steps of:

receiving a decoded, split first video stream;

receiving a corresponding re-encoded, split second video stream, said first video stream and said second video stream comprising two identical decoded split video streams derived from said video stream;

arranging a frame of the decoded video stream not having been re-encoded and a corresponding frame of the video stream re-encoded into the second video format into a combined wide video frame such that said decoded video frame and said corresponding re-encoded video frame appear together in the combined wide video frame, the frame having two associated boolean identifiers, one for a filled left half of the combined wide frame and one for a filled right half of the combined wide frame, with a left and right half of the combined wide video frame each representing a respective complete video frame of either the decoded portion of the video stream or the re-encoded portion of the video stream; and maintaining in said memory a buffer pool of wide frames for storing said combined decoded video frames and corresponding re-encoded video frames, wherein a queue is implemented for the wide frames of said buffer pool to define an order for stored video frames and the queue comprises the two boolean identifiers; and a display device for displaying the frame of the decoded video and the corresponding frame of the re-encoded video in the combined wide video frame.

13. The system of claim 12, wherein said video mixer is further adapted to perform a scaling routine on said received decoded first video stream or said received corresponding re-encoded second video stream to scale the received video streams such that displayed images will comprise the same dimensions.

14. The system of claim 12, wherein said video mixer arranges received decoded video frames and received corresponding re-encoded video frames in respective combined wide video frames such that the received video frames appear side-by-side when displayed by said display device.

15. The system of claim 12, wherein said video mixer arranges received decoded video frames and received corresponding re-encoded video frames in respective combined wide video frames such that the video frames appear inverted along the x-axis with respect to one another when displayed by said display device.

16. The system of claim 12, wherein said video mixer arranges received decoded video frames and received corresponding re-encoded video frames in respective combined wide video frames such that half of a decoded video frame appears next to a respective half of a corresponding re-encoded video frame when displayed by said display device.

* * * * *